US010888107B2

(12) United States Patent
McCalley et al.

(10) Patent No.: US 10,888,107 B2
(45) Date of Patent: Jan. 12, 2021

(54) PUMP FEEDER AND METHOD OF MIXING EDIBLE MATERIAL

(71) Applicant: General Mills, Inc., Minneapolis, MN (US)

(72) Inventors: Rodney McCalley, Carver, MN (US); Ralph A. Stenvik, Plymouth, MN (US); Zac Harder, Crystal, MN (US)

(73) Assignee: General Mills, Inc., Minneapolis, MN (US)

( * ) Notice: Subject to any disclaimer, the term of this patent is extended or adjusted under 35 U.S.C. 154(b) by 284 days.

(21) Appl. No.: 15/444,673

(22) Filed: Feb. 28, 2017

(65) Prior Publication Data

US 2018/0242630 A1  Aug. 30, 2018

(51) Int. Cl.
*A23P 30/25* (2016.01)
*A23P 30/20* (2016.01)
*B01F 15/02* (2006.01)
*B01F 7/00* (2006.01)
*B01F 7/04* (2006.01)

(Continued)

(52) U.S. Cl.
CPC .............. *A23P 30/25* (2016.08); *A23P 30/20* (2016.08); *B01F 7/00166* (2013.01); *B01F 7/04* (2013.01); *B01F 15/0229* (2013.01); *B01F 15/0289* (2013.01); *B29C 48/0022* (2019.02); *B29C 48/022* (2019.02); *B29C 48/37* (2019.02); *B01F 2215/0014* (2013.01); *B26D 2210/02* (2013.01)

(58) Field of Classification Search
CPC . A23P 30/20; A23P 30/25; A22C 5/00; A21C 1/00; A21C 1/003; A21C 1/006; A21C 1/065; A21C 11/20; A21C 1/06; A21C 3/04
See application file for complete search history.

(56) References Cited

U.S. PATENT DOCUMENTS 3,114,933 A * 12/1963 Conrad ................. B29C 48/395
366/86
3,203,370 A * 8/1965 Friedrich ................ A21C 1/065
366/100

(Continued)

FOREIGN PATENT DOCUMENTS

| CN | 205274498 | 6/2016 | | |
|---|---|---|---|---|
| DE | 3622052 A1 | * | 1/1987 | .............. A21C 1/06 |
| FR | 2584266 A1 | * | 1/1987 | .............. B01F 7/047 |

*Primary Examiner* — Seyed Masoud Malekzadeh
(74) *Attorney, Agent, or Firm* — Diederiks & Whitelaw, PLC; Gregory P. Kaihoi, Esq.

(57) ABSTRACT

A pump feeder includes a hopper, a first mixing paddle, a second mixing paddle, a first auger, a second auger and dual outlets. The hopper receives edible material in the form of a thick, viscous base and mix-ins, and includes an upper chamber and a lower chamber. The first and second mixing paddles are located within the upper chamber and cause movement of the edible material within the upper chamber for both breaking apart and mixing of the edible material. The first and second augers are located within the lower chamber and cause movement of the edible material from a first end of the lower chamber to a second end of the lower chamber. The outlets are located at the second end of the lower chamber and connected to an inlet of a pump which further compresses the mixed edible material for delivery to an extruder die and cutting assembly.

25 Claims, 6 Drawing Sheets

(51) Int. Cl.
  *B29C 48/37* (2019.01)
  *B29C 48/00* (2019.01)

(56) References Cited

U.S. PATENT DOCUMENTS

| | | | | |
|---|---|---|---|---|
| 3,347,177 A * | 10/1967 | Celorio | ............... | A21C 5/00 425/308 |
| 3,467,030 A * | 9/1969 | Ruiz | ............... | A21C 9/08 425/363 |
| 3,473,896 A | 10/1969 | Halder et al. | | |
| 3,559,561 A * | 2/1971 | Page | ............... | A23J 3/227 425/461 |
| 3,879,150 A * | 4/1975 | Brown | ............... | F04B 19/12 222/238 |
| 3,901,482 A * | 8/1975 | Kieffaber | ............... | A21C 1/06 366/85 |
| 3,901,483 A * | 8/1975 | Lasar | ............... | A22C 5/00 366/193 |
| 4,438,634 A * | 3/1984 | Merle | ............... | F25C 1/147 366/168.1 |
| 4,443,109 A * | 4/1984 | Watts | ............... | B01F 5/241 222/132 |
| 4,462,693 A * | 7/1984 | Buschbom | ............... | A01K 5/002 366/189 |
| 4,504,253 A * | 3/1985 | Buschbom | ............... | B01F 7/02 474/114 |
| 4,627,555 A * | 12/1986 | Locke | ............... | G01F 11/20 222/200 |
| 5,773,053 A * | 6/1998 | Song | ............... | A23G 4/02 426/3 |
| 5,993,187 A * | 11/1999 | Manser | ............... | A21C 1/003 425/202 |
| 7,488,502 B2 * | 2/2009 | Morin | ............... | A22C 5/00 426/231 |
| 7,731,998 B2 * | 6/2010 | Morin | ............... | A22C 5/00 426/281 |
| 7,964,128 B2 * | 6/2011 | Caretta | ............... | B29B 7/007 264/211.21 |
| 9,795,157 B2 * | 10/2017 | Eugster | ............... | B02B 1/04 |
| 2002/0075755 A1 * | 6/2002 | Huber | ............... | A22C 5/00 366/152.1 |
| 2002/0176319 A1 * | 11/2002 | Huber | ............... | A22C 5/00 366/186 |
| 2004/0076726 A1 * | 4/2004 | Lucas | ............... | A23P 10/25 426/510 |
| 2004/0136261 A1 * | 7/2004 | Huber | ............... | B01F 7/042 366/152.1 |
| 2007/0065550 A1 * | 3/2007 | Rivero | ............... | A21C 9/04 426/515 |
| 2007/0166448 A1 * | 7/2007 | Holmes | ............... | A01J 27/04 426/582 |
| 2011/0014311 A1 * | 1/2011 | Holmes | ............... | A01J 27/04 425/112 |
| 2015/0053097 A1 * | 2/2015 | Vardakostas | ............ | A23P 20/20 99/450.4 |

* cited by examiner

PUMP FEEDER AND METHOD OF MIXING EDIBLE MATERIAL

BACKGROUND OF THE INVENTION

The present invention pertains to food production and, more particularly, to the mixing and extrusion of highly viscous food ingredients.

When producing food products in a commercial setting, it is advantageous to do so as quickly as possible since this typically reduces the per unit cost of production. Accordingly, a variety of different machines are used in the art to speed up food production. However, not all processes can be easily automated. For example, machines sometimes have difficulty working with especially viscous ingredients. Date paste is one such ingredient. Date paste has the consistency of a cold peanut butter, and overworking date paste causes the date paste to take on the consistency of taffy. As a result, mixing additional ingredients into date paste has proven challenging. In addition, maintaining a consistent supply of a viscous edible material in a mass production setting is also problematic. In connection with the present invention, there is seen to be a need in the art for a machine that can mix additional ingredients into a viscous material, particularly a machine capable of mixing these additional ingredients into the viscous material without breaking down the additional ingredients and without overworking the viscous material. It is also desirable that the machine be able to handle both large and small chunks of the viscous material, as well as to supply a consistent or uniform amount of the mixed material for final product forming and cutting operations.

SUMMARY OF THE INVENTION

The present invention is directed to a pump feeder comprising a hopper, a first mixing paddle, a second mixing paddle, a first auger, a second auger and an outlet region. The hopper is configured to receive edible material and includes an upper chamber and a lower chamber. The first and second mixing paddles are located within the upper chamber. The first and second mixing paddles are configured to cause movement of edible material within the upper chamber. The first and second augers are located within the lower chamber. The first and second augers are configured to cause movement of edible material from a first end of the lower chamber to a second end of the lower chamber. The outlet region is defined by dual outlets located at the second end of the lower chamber and configured to connect to an inlet of a pump of an extruder.

In one embodiment, the first auger has a first region with a relatively larger screw pitch and a second region with a relatively smaller screw pitch, the first region being located at the first end of the lower chamber and the second region being located at the second end of the lower chamber. The second auger also has a first region with a relatively larger screw pitch and a second region with a relatively smaller screw pitch, the first region being located at the first end of the lower chamber and the second region being located at the second end of the lower chamber. The first region of the first auger and the first region of the second auger are located directly below the upper chamber. The second region of the first auger and the second region of the second auger are located forward of the upper chamber. Preferably, the first and second augers are configured to counter rotate. Also, the first and second augers are offset rotationally by 180 degrees and do not intermesh.

The first mixing paddle is configured to cause movement of edible material from a front of the upper chamber toward a rear of the upper chamber. The second mixing paddle is configured to cause movement of edible material from the rear of the upper chamber toward the front of the upper chamber. The first mixing paddle has a first contact face, and the second mixing paddle has a second contact face. The first and second contact faces are concave.

A divider is provided to maintain a first outlet associated with the first auger and a second outlet associated with the second auger. The first outlet is concentric with a rotational axis of the first auger, and the second outlet is concentric with a rotational axis of the second auger. With this arrangement, a dual supply is assured from the pump feeder.

The hopper includes a front wall, a back wall, a first sidewall and a second sidewall defining the upper chamber. The first and second sidewalls define different shapes. The first sidewall includes a first plurality of panels, and the second sidewall includes a second plurality of panels. The first plurality of panels is greater in number than the second plurality of panels. The hopper further includes at least a third sidewall defining the lower chamber.

The pump feeder is actually part of an overall food production apparatus which also includes a conveyor, a pump and a cutter. The conveyor is configured to transport edible material to the hopper, and the pump is configured to be supplied with the mixed edible material from the dual auger outlets, further compress the material and force the edible material through an extrusion die which forms the edible material into a desired shape. The cutter is configured to cut edible material exiting the extrusion die at a desired length.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
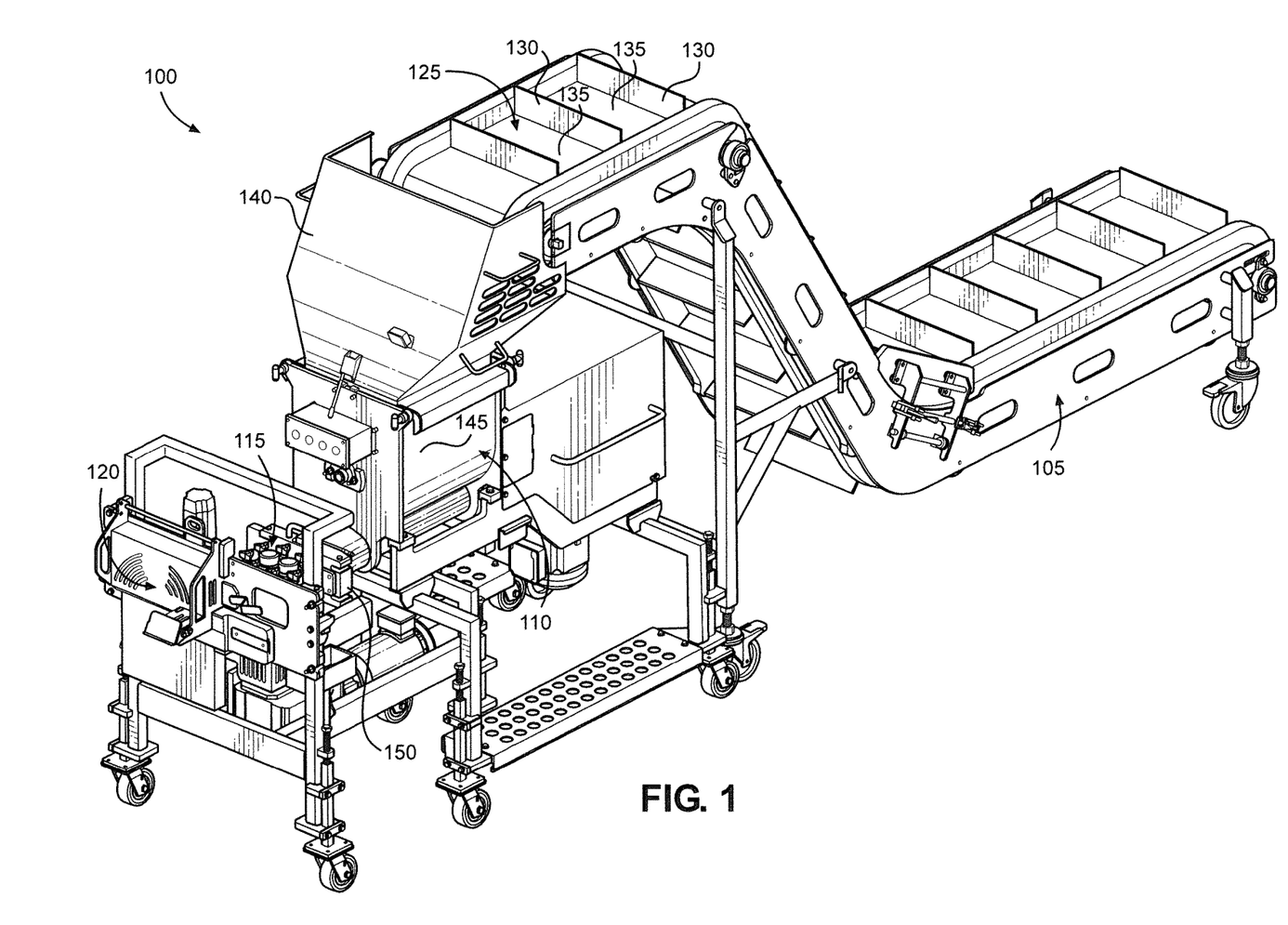
FIG. 1 is a perspective view of a food production apparatus constructed in accordance with the present invention.

With initial reference to FIG. 1, there is shown a food production apparatus 100 constructed in accordance with the present invention. Apparatus 100 includes a conveyor 105, a pump feeder 110, a pump 115 and a cutter 120. Conveyor 105 is configured to transport edible material (not shown) to pump feeder 110. Conveyor 105 includes a belt 125 having a plurality of dividers 130 that define a plurality of bins 135. Bins 135 are configured to hold the edible material while belt 125 is rotated. As the edible material falls off belt 125, the edible material passes through a chute 140 and enters a hopper 145 of pump feeder 110. Pump feeder 110 mixes and compresses the edible material, as will be discussed in more detail below. The edible material then passes through an outlet region 150 of pump feeder 110 to enter pump 115. Pump 115 is configured to force the edible material through an extrusion die (not visible). As the edible material exits the extrusion die, the edible material is cut into the desired shape by cutter 120. In one embodiment, cutter 120 is configured to cut the edible material into a plurality of bars. In a particular embodiment, cutter 120 is designed to perform 230 cuts/minute.

Although apparatus 100 can be used to produce a variety of different food products, apparatus 100 is specifically designed to handle especially viscous materials. For example, the edible material discussed in connection with FIG. 1 can be a date paste, which has the consistency of a cold peanut butter. Particularly relevant in connection with the invention is the inclusion of mix-ins, such as nuts, fruit, chocolate or combinations thereof, which are added to the date paste. Although such mix-ins are typically present on conveyor 105 along with the date paste, the mix-ins are not incorporated or fully mixed into the date paste at this point. Instead, mixing occurs within pump feeder 110, which is designed to combine the mix-ins with the date paste, specifically without breaking down the mix-ins and without overworking the date paste. Overworking the date paste is undesirable since it causes the date paste to take on the consistency of taffy. Also, because the date paste arriving from conveyor 105 is not uniformly sized, pump feeder 110 is designed to handle both large and small chunks of date paste.

Figure 2:
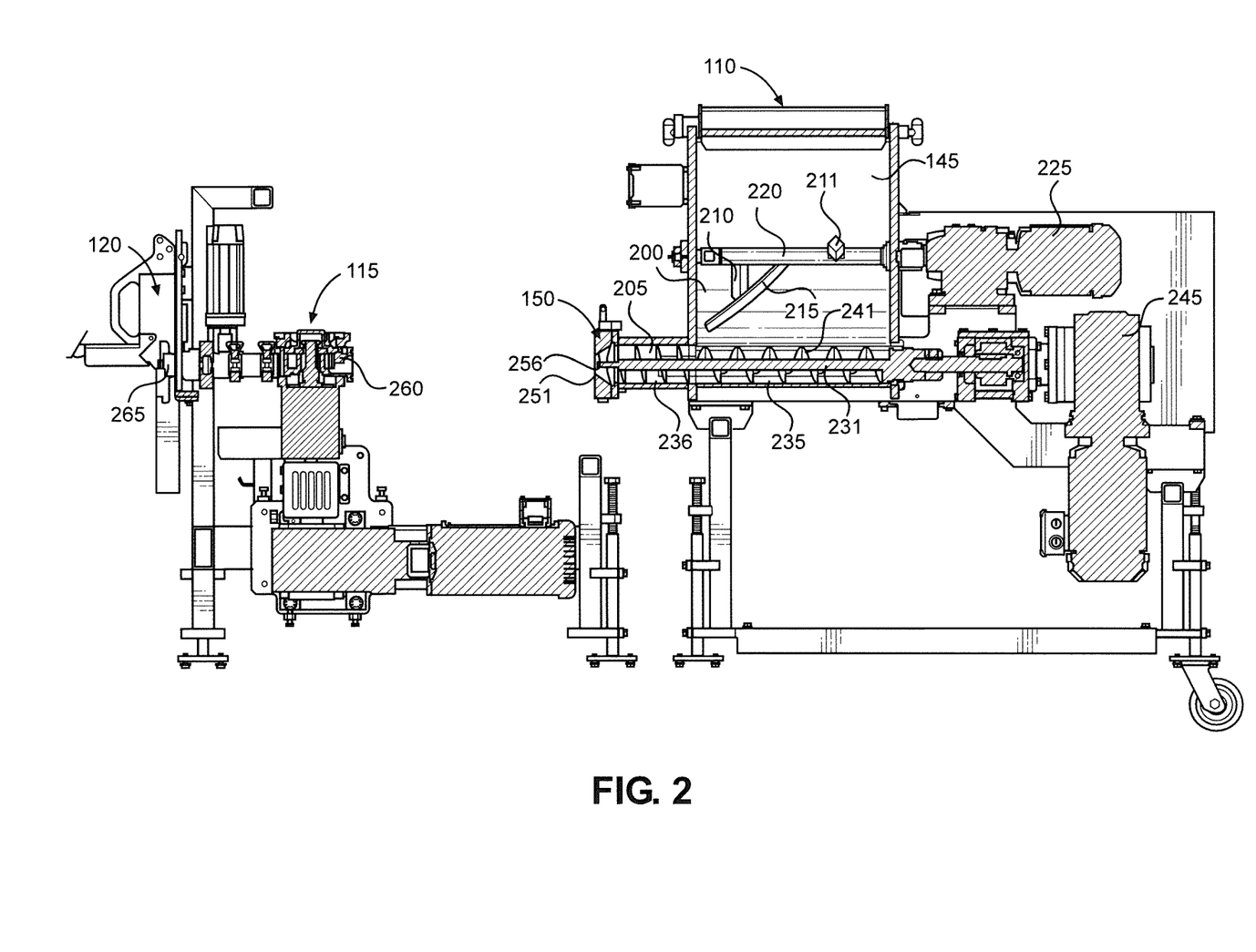
FIG. 2 is a partial cross section of a pump feeder and pump of the food production apparatus.

With reference now to FIG. 2, pump feeder 110 and pump 115 are shown in partial cross section. As a result, a portion of the interior of hopper 145 is visible. Hopper 145 includes an upper mixing chamber 200 and a lower compression chamber 205. Two mixing arms 210 and 211 are located within upper chamber 200. Mixing arms 210 and 211 include corresponding mixing paddles 215 and 216, although mixing paddle 216 is not visible in FIG. 2. Mixing arms 210 and 211 are connected to a mixing shaft 220, which is driven by a mixing motor 225. Rotation of mixing shaft 220 causes mixing paddles 215 and 216 to revolve around an axis defined by mixing shaft 220. As mixing paddles 215 and 216 move, mixing paddles 215 and 216 mix the edible material present in upper chamber 200 and break up any large chunks, generally by shifting the large chunks axially back and forth within upper chamber 200 until the chunks break up. As the edible material is broken up, it falls down to augers 230 and 231, although only auger 231 is visible in FIG. 2. As mentioned above, augers 230 and 231 are located in lower chamber 205, which has a first portion 235 directly below upper chamber 200 and a second portion 236 forward of upper chamber 200. Augers 230 and 231 include corresponding threads 240 and 241 and are driven by an auger motor 245. Rotation of augers 230 and 231 causes the edible material located between threads 240 and 241 to move from first portion 235 of lower chamber 205 to second portion 236 of lower chamber 205. Since threads 240 and 241 have a relatively larger screw pitch in first portion 235 (e.g., a 3 inch pitch) and a relatively smaller screw pitch in second portion 236 (e.g., a 2 inch pitch), the edible material located between threads 240 and 241 is compressed as it moves from first portion 235 to second portion 236.

Once the edible material reaches outlet region 150 of pump feeder 110, the edible material is further compressed due to the tapered shape of outlet region 150. Specifically, outlet region 150 is divided into two outlets 250 and 251, corresponding to augers 230 and 231 respectively. Outlet 251 has a tapered inner profile 256 (see FIG. 1) such that the edible material arriving at outlet 251 is compressed as it passes through outlet 251. As with auger 230, outlet 250 is not visible in FIG. 2. However, outlet 250 has a corresponding tapered inner profile. After passing through outlet region 150, the edible material enters an inlet 260 of pump 115, which is shown spaced from pump feeder 110 in FIG. 2 for illustration purposes. In use, outlet region 150 is connected to inlet 260. Pump 115 forces the edible material entering inlet 260 through an extrusion die 265. Upon exiting extrusion die 265, the edible material is cut by cutter 120.

Figure 3:
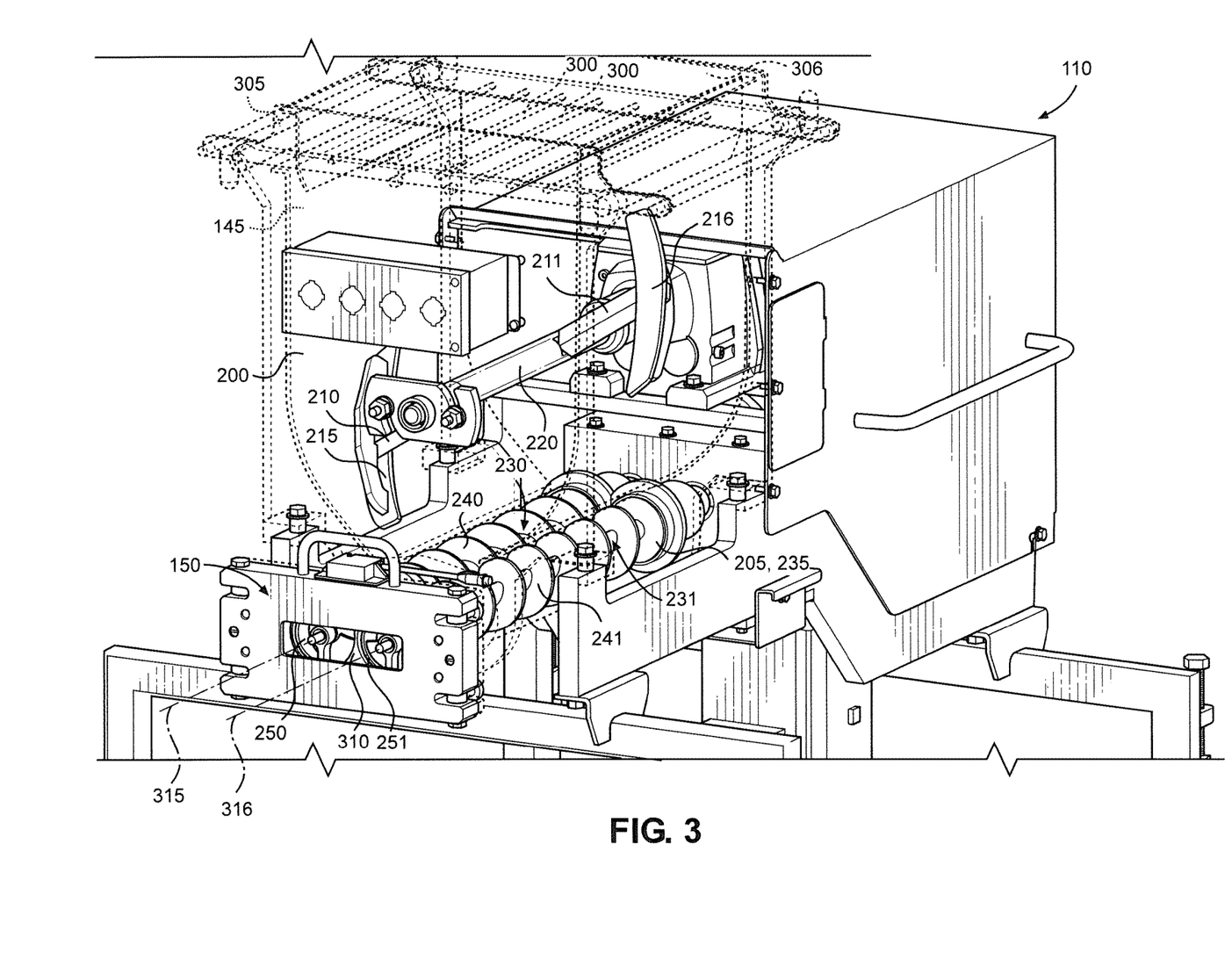
FIG. 3 is a perspective view of the pump feeder.

With reference now to FIG. 3, a perspective view of pump feeder 110 is provided. Mixing paddle 216, auger 230 and outlet 250 are now visible. In addition, a plurality of bars 300 can be seen. Bars 300 extend from a front wall 305 of hopper 145 to a rear wall 306 of hopper 145 and are configured to at least partially break up the edible material as it enters hopper 145 from conveyor 105. A divider 310 is located at outlet region 150 to divide outlet region 150 into separate outlets 250 and 251. Outlet 250 is associated with auger 230, while outlet 251 is associated with auger 231. Specifically, in the embodiment shown, outlet 250 is concentric with a rotational axis 315 of auger 230, and outlet 251 is concentric with a rotational axis 316 of auger 231.

Figure 4:
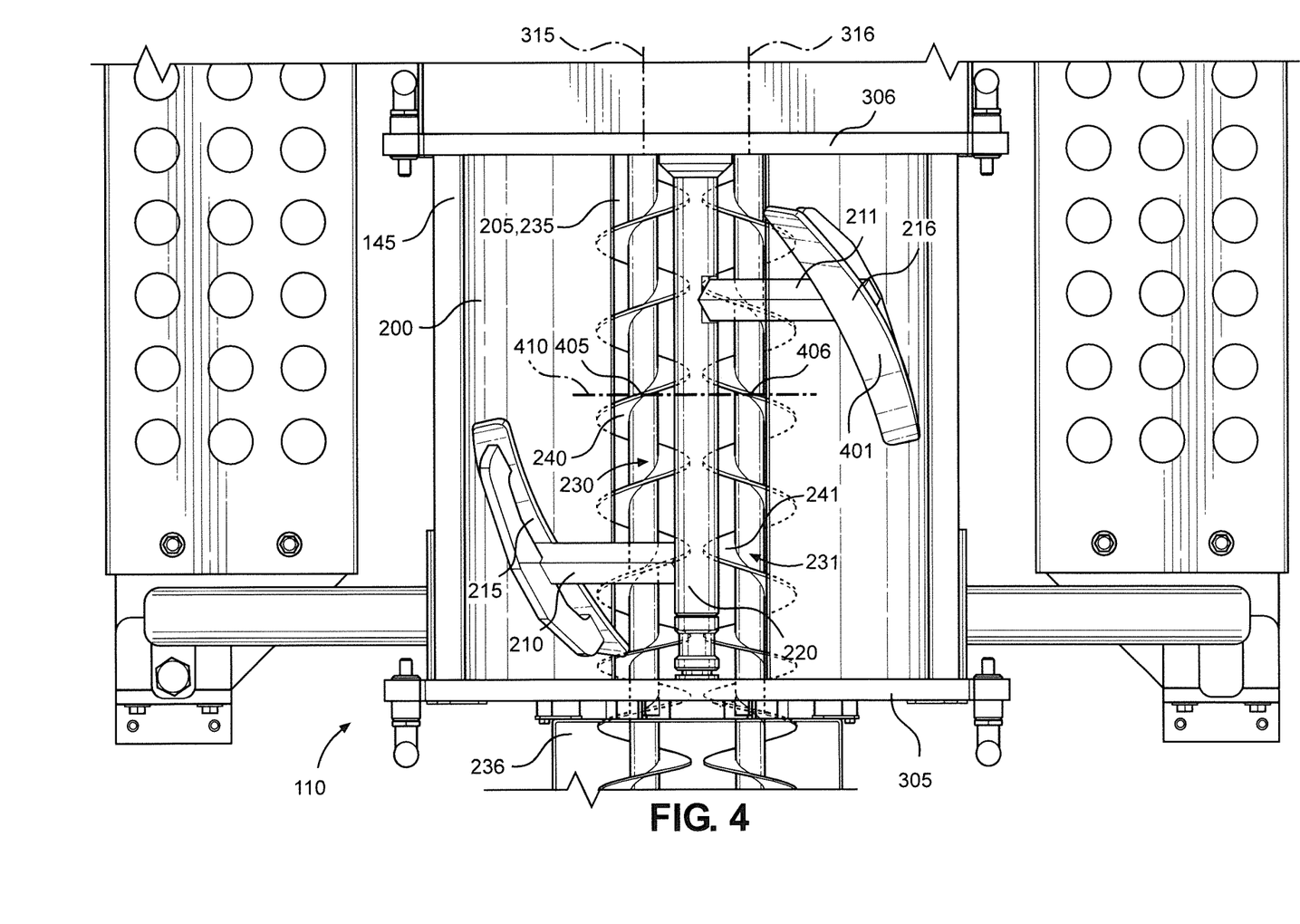
FIG. 4 is a top view of the pump feeder.

FIG. 4 is a top view of pump feeder 110. This view particularly highlights the arrangement of mixing paddles 215 and 216. Mixing paddle 215 is located relatively closer to a front of upper chamber 200 (i.e., relatively closer to front wall 305), while mixing paddle 216 (which is a mirror image of mixing paddle 215) is located relatively closer to a rear of upper chamber 200 (i.e., relatively closer to rear wall 306). Mixing paddle 215 is angled such that, as mixing paddle 215 revolves around mixing shaft 220, mixing paddle 215 moves the edible material within upper chamber 200 from the front of upper chamber 200, past a central portion of the upper chamber, and toward the rear of upper chamber 200. Similarly, mixing paddle 216 is angled such that, as mixing paddle 216 revolves around mixing shaft 200, mixing paddle 216 moves the edible material within upper chamber 200 from the rear of upper chamber 200, past a central portion of the upper chamber, and toward the front of upper chamber 200. The resulting back and forth motion of the edible material aids in mixing and breaking up the edible material. Preferably, mixing paddles 215 and 216 are also concave, as in the embodiment shown. In particular, the contact faces of mixing paddles 215 and 216 are concave. For purposes of the present invention, the contact face of a mixing paddle is defined as the face of the mixing paddle that first contacts edible material during movement of the mixing paddle. While the contact face of mixing paddle 215 is not visible in FIG. 4, a contact face 401 of mixing paddle 216 can be seen.

The view of FIG. 4 also highlights the arrangement of augers 230 and 231. Augers 230 and 231 counter rotate and do not intermesh. Also, rotational axes 315 and 316 of augers 230 and 231 are at least substantially parallel (i.e., within 5 degrees of being parallel). Augers 230 and 231 are offset rotationally by 180 degrees such that, at a given moment, the uppermost crests of auger 230 are located at the same positions along the length of lower chamber 205 as the uppermost crests of auger 231. For example, an uppermost crest 405 of auger 230 and an uppermost crest 406 of auger 231 are both located at a position 410 in FIG. 4. Because of this arrangement, the edible material located within threads 240 and 241 is moved along lower chamber 205, from first portion 235 of lower chamber 205 to second portion 236 of lower chamber 205, as augers 230 and 231 rotate. The edible material is partially mixed by augers 230 and 231, while being compressed as it moves from first portion 235 to second portion 236 since the pitch of threads 240 and 241 is larger in first portion 235 than in second portion 236.

Figure 5:
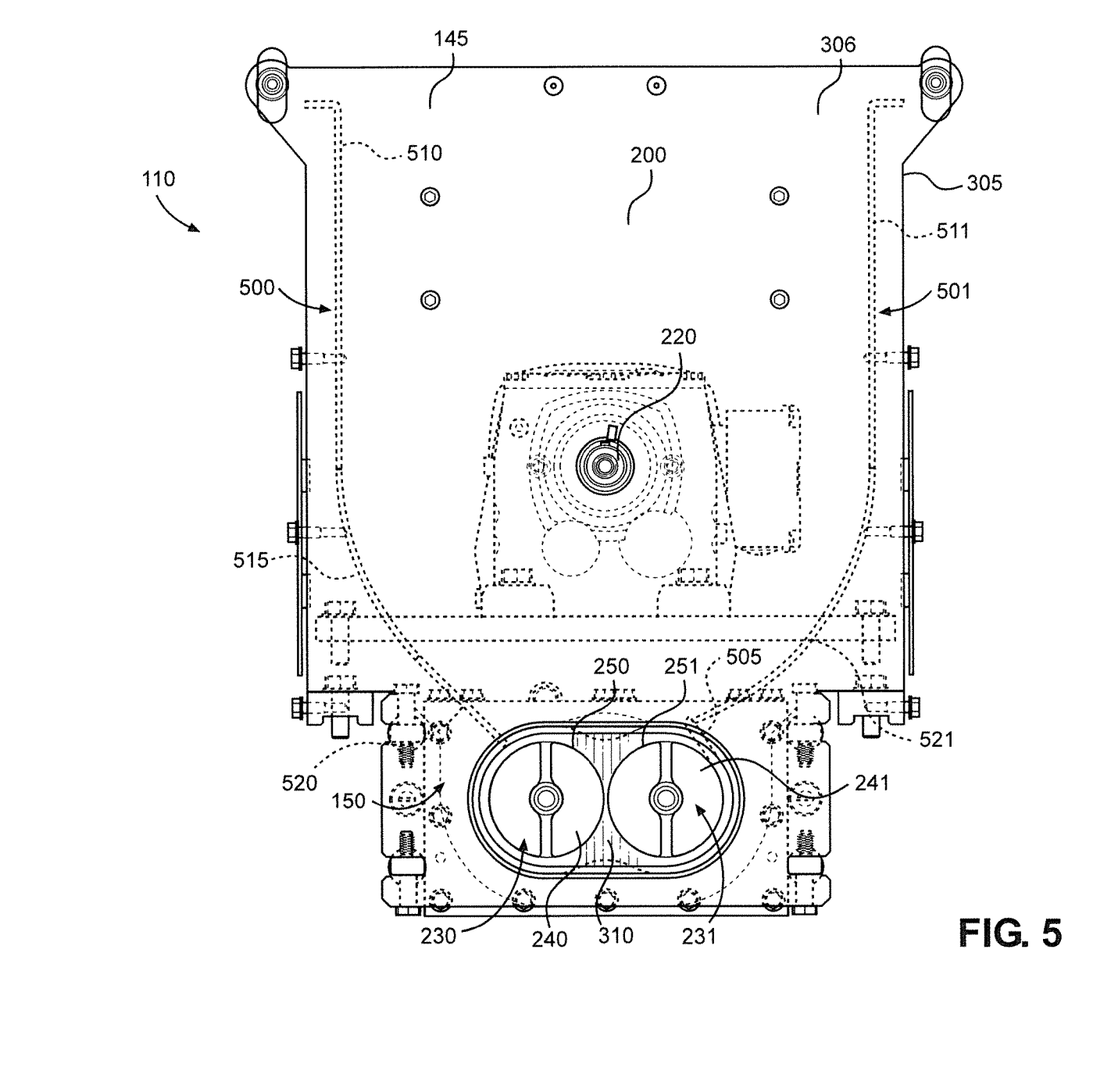
FIG. 5 is a front view of the pump feeder.

With reference now to FIG. 5, a front view of pump feeder 110 is provided. For simplicity, mixing arms 210 and 211 and mixing paddles 215 and 216 are not shown. Hopper 145 includes a first sidewall 500 and a second sidewall 501 that, together with front wall 305 and rear wall 306, define upper chamber 200. Hopper 145 also includes a third sidewall 505 defining lower chamber 205. First sidewall 500 is not identical to second sidewall 501 (i.e., sidewalls 500 and 501 are not mirror images of one another). Although sidewalls 500 and 501 include corresponding upper panels 510 and 511, first sidewall 500 includes a middle panel 515 and a lower panel 520, while second sidewall 501 includes only a lower panel 521. In addition, as can be seen in FIG. 5, middle panel 515 and lower panel 520 do not define the same shape as lower panel 521.

Figure 6:
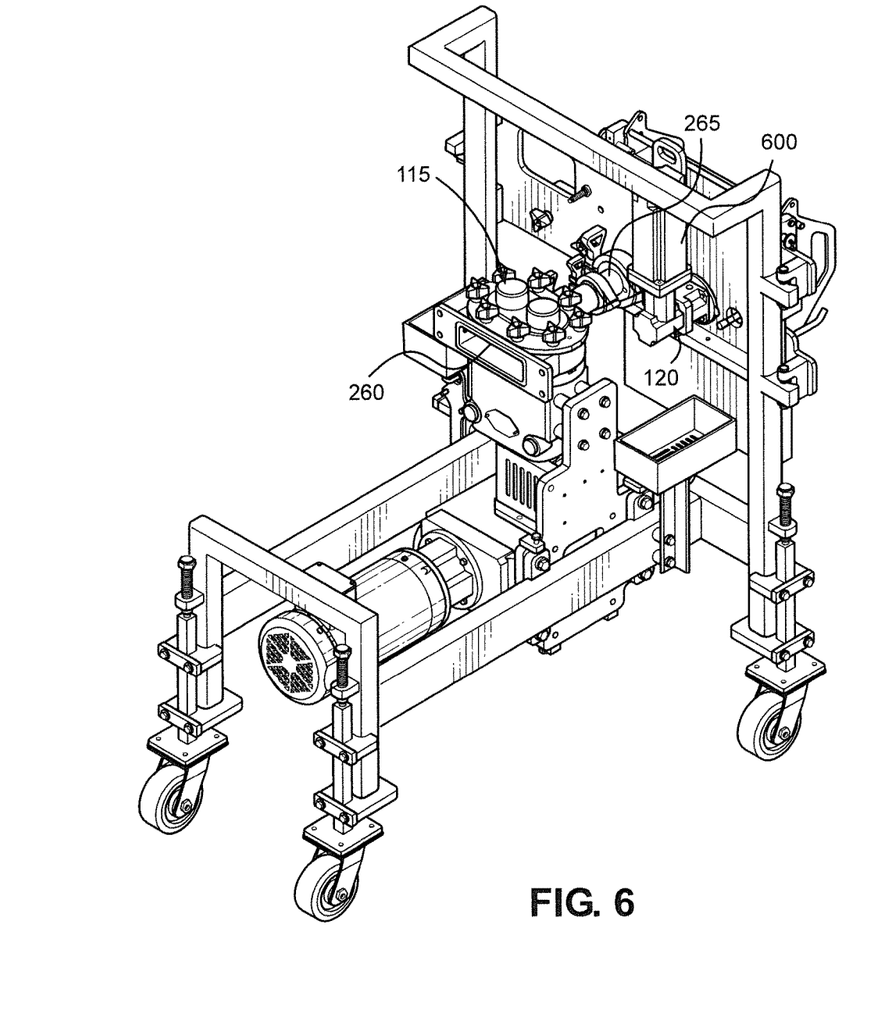
FIG. 6 is a rear perspective view of the pump and a cutter of the food production apparatus.

FIG. 6 is a rear perspective view of pump 115 and cutter 120. In use, inlet 260 of pump 115 is connected to outlet region 150 of pump feeder 110 so that edible material can pass from pump feeder 110 to pump 115. Pump 115 forces the edible material through extrusion die 265, at which point the edible material is cut into the desired shape by cutter 120 (see FIG. 1). In one embodiment, cutter 120 includes a single blade, counterweighted for enhanced tip speed, coupled to a rotating holder (not visible), with the rotating holder being driven by a motor 600 to cut the edible material into a plurality of bars.

Based on the above, it should be readily apparent that the present invention provides a machine that can mix particulates to an especially viscous edible material without destroying (e.g., grinding or otherwise breaking down into smaller pieces) the particulates, and then form the edible material into a desired shape. The machine can also accomplish this without overworking the viscous edible material. Also, the machine can handle both large and small chunks of edible material. Although the present invention has been generally described in connection with edible material, the invention has particular applicability for use with making bars from an edible material that is thick and sticky, e.g., having the consistency of a cold peanut butter. For instance, date paste has a very thick and sticky consistency, which can make it difficult to work with, while recognizing that overworking this material will quickly result in an extremely thick, unworkable intermediate product. However, it was found that the present invention provides good results when used to mix, extrude and then cut date paste-based products into bars. That is, even though the particulates may not be homogeneously distributed throughout the date paste (even on the conveyor, in the hopper or along the augers), the distributions is reasonably consistent. Most importantly, the mixed material is stuffed into the pump in a substantially uniform manner so as to prevent pauses in the operation of the pump which can result in varying length bars or even a time where no product is present to cut such that an empty package is produced. Although not emphasized above, the hopper can include a level sensor to control the fill level, such as by automatically regulating the speed of the supply conveyor. In addition, while certain preferred embodiments of the present invention have been set forth, it should be understood that various changes or modifications could be made without departing from the spirit of the present invention. In general, the invention is only intended to be limited by the scope of the following claims.

The invention claimed is:
1. A pump feeder comprising:
a hopper configured to receive edible material, the hopper including an upper chamber and a lower chamber;
a first mixing paddle located within the upper chamber;
a second mixing paddle located within the upper chamber, the first and second mixing paddles being configured to cause movement of the edible material within the upper chamber, wherein the first mixing paddle is configured to cause movement of the edible material from a front portion of the upper chamber, past a central portion of the upper chamber, to a rear portion of the upper chamber, and the second mixing paddle is configured to cause movement of edible material from the rear portion of the upper chamber, past the central portion of the upper chamber, to the front portion of the upper chamber;
a mixing shaft, wherein the pump feeder is configured such that rotation of the mixing shaft causes the first and second mixing paddles to revolve around an axis defined by the mixing shaft, and the first and second mixing paddles are angled with respect to the axis, wherein the first mixing paddle is located relatively closer to the front portion of the upper chamber, while the second mixing paddle is located relatively closer to the rear portion of the upper chamber;
a first auger located within the lower chamber;
a second auger located within the lower chamber, the first and second augers being configured to cause movement of the edible material from a first end of the lower chamber to a second end of the lower chamber; and
an outlet region located at the second end of the lower chamber, the outlet region being configured to connect to an inlet of a pump.
2. The pump feeder of claim 1, wherein:
the first auger has a first region with a relatively larger screw pitch and a second region with a relatively smaller screw pitch, the first region of the first auger being located at the first end of the lower chamber and the second region of the first auger being located at the second end of the lower chamber; and
the second auger has a first region with a relatively larger screw pitch and a second region with a relatively smaller screw pitch, the first region of the second auger being located at the first end of the lower chamber and the second region of the second auger being located at the second end of the lower chamber.
3. The pump feeder of claim 2, wherein:
the first region of the first auger and the first region of the second auger are located directly below the upper chamber; and
the second region of the first auger and the second region of the second auger are located forward of the upper chamber.
4. The pump feeder of claim 1, wherein the first and second augers are configured to counter rotate.
5. The pump feeder of claim 4, wherein the first and second augers are offset rotationally by 180 degrees.
6. The pump feeder of claim 5, wherein the first and second augers do not intermesh.

7. The pump feeder of claim 1, wherein:
the first mixing paddle has a first contact face;
the second mixing paddle has a second contact face; and
the first and second contact faces are concave.

8. The pump feeder of claim 1, further comprising a divider located at the outlet region, the divider establishing, in the outlet region, a first outlet associated with the first auger and a second outlet, which is spaced from the first outlet, associated with the second auger.

9. The pump feeder of claim 8, wherein:
the first outlet is concentric with a rotational axis of the first auger; and
the second outlet is concentric with a rotational axis of the second auger.

10. The pump feeder of claim 1, wherein the hopper includes a front wall, a back wall, a first sidewall and a second sidewall defining the upper chamber, the first and second sidewalls defining different shapes.

11. The pump feeder of claim 10, wherein:
the first sidewall includes a first plurality of panels;
the second sidewall includes a second plurality of panels; and
the first plurality of panels is greater in number than the second plurality of panels.

12. The pump feeder of claim 10, wherein the hopper further includes a third sidewall defining the lower chamber.

13. The pump feeder of claim 1, wherein the pump feeder is part of a food production apparatus including:
a conveyor including bins configured to transport edible material to the hopper;
the pump configured to receive the edible material from the outlet region and force the edible material through an extrusion die; and
a blade configured to cut the edible material exiting the extrusion die.

14. A method of mixing edible material with a pump feeder, the method comprising:
causing the edible material to enter a hopper, the hopper including an upper chamber and a lower chamber;
causing the edible material to move within the upper chamber with a first mixing paddle and a second mixing paddle by rotating a mixing shaft to cause the first and second mixing paddles to revolve around an axis defined by the mixing shaft, wherein the first and second mixing paddles being located within the upper chamber and angled with respect to the axis;
causing the edible material to move from a front portion of the upper chamber toward a rear portion and past a central portion of the upper chamber with the first mixing paddle;
causing the edible material to move from the rear portion of the upper chamber toward the front portion and past the central portion of the upper chamber with the second mixing paddle, wherein the first mixing paddle is located relatively closer to the front portion of the upper chamber, while the second mixing paddle is located relatively closer to the rear portion of the upper chamber;
causing the edible material to move from a first end of the lower chamber to a second end of the lower chamber with a first auger and a second auger, the first and second augers being located within the lower chamber; and
causing the edible material to exit an outlet of the pump feeder and enter an inlet of a pump, the outlet being located at the second end of the lower chamber.

15. The method of claim 14, wherein:
the first auger has a first region with a relatively larger screw pitch and a second region with a relatively smaller screw pitch, the first region of the first auger being located at the first end of the lower chamber and the second region of the first auger being located at the second end of the lower chamber; and
the second auger has a first region with a relatively larger screw pitch and a second region with a relatively smaller screw pitch, the first region being located at the first end of the lower chamber and the second region being located at the second end of the lower chamber,
the method further comprising compressing the edible material as the edible material is moved from the first end of the lower chamber to the second end of the lower chamber.

16. The method of claim 14, further comprising counter rotating the first and second augers.

17. The method of claim 16, further comprising rotating the first and second augers with the first and second augers being offset rotationally by 180 degrees.

18. The method of claim 14, wherein a divider is located at the outlet, the divider dividing the outlet into a first outlet associated with the first auger and a second outlet associated with the second auger, the method further comprising causing the edible material to exit the pump feeder from both the first and second outlets.

19. The method of claim 18, further comprising transferring the edible material from the outlet region of the pump feeder to the pump wherein the edible material received from both of the first and second outlets are merged and directed through an extrusion die.

20. The method of claim 14, wherein the hopper includes a front wall, a back wall, a first sidewall and a second sidewall defining the upper chamber, the method further comprising directing the edible material to the first and second augers along the first and second sidewalls which define different shapes.

21. The method of claim 14, wherein the edible material is a combination of a date paste and mix-ins, with the mix-ins in being particulates.

22. The method of claim 21, wherein the particulates are selected from the group consisting of nuts, fruit pieces, chocolate and combinations thereof.

23. The method of claim 14, wherein:
the first mixing paddle has a first contact face;
the second mixing paddle has a second contact face; and
the first and second contact faces are concave.

24. The method of claim 14, wherein causing the edible material to enter the hopper includes causing the edible material to enter at both the front portion and the rear portion of the upper chamber and wherein:
the first mixing paddle has a first contact face;
the second mixing paddle has a second contact face; and
the first and second contact faces are curved.

25. The pump feeder of claim 1, wherein:
the hopper is configured to receive the edible material at both the front portion and the rear portion of the upper chamber;
the first mixing paddle has a first contact face;
the second mixing paddle has a second contact face; and
the first and second contact faces are curved.

* * * * *